UNITED STATES PATENT OFFICE.

CLOVIS KNAB, OF HOUSSIGNY, ASSIGNOR TO THE SOCIÉTÉ ANONYME LORRAINE INDUSTRIELLE, OF NANCY, FRANCE.

PROCESS OF MAKING SODIUM CARBONATE.

SPECIFICATION forming part of Letters Patent No. 287,551, dated October 30, 1883.

Application filed July 3, 1883. (No specimens.) Patented in France July 25, 1882, No. 150,222; in Belgium August 19, 1882, No. 58,798; in Luxemburg August 21, 1882; in England August 30, 1882, No. 4,144, and in Italy September 12, 1882, No. 14,581.

*To all whom it may concern:*

Be it known that I, CLOVIS KNAB, a citizen of the Republic of France, residing at Houssigny, in the Department of Meurthe et Moselle, in the Republic of France, have invented a new and useful Improvement in the Manufacture of Caustic Potash and Soda and their Carbonates, of which the following is a specification.

My invention relates to improvements on the well-known process of manufacturing caustic soda or potash by the reaction of mixtures of lead oxide and sodium chloride; and it consists, chiefly, in the application of alcohol as a solvent for the sodium hydrate, whereby it is separated from the lead chloride. This process permits the obtaining of caustic soda and caustic potash directly from chloride of sodium and chloride of potassium; also, when desired, the obtaining of the carbonates of potash and of soda directly from the chlorides of sodium and potassium without its being necessary to produce the caustic alkalies. To obtain these results advantage has been taken of the relative insolubility of chloride of lead by putting chloride of sodium or chloride of potassium in presence of litharge or oxide of lead with the equivalent of water necessary to produce $KO,HO$ or $NaO,HO$. This produces in a short time by simple mixture, or in a shorter time by grinding, a complete reaction. The result of this is chloride of lead almost insoluble, and caustic soda or caustic potash, (according to the alkaline chloride employed,) which impregnates the chloride of lead and forms with it a very white and very thick paste; but if it be desired to extract from this paste by a methodical washing, even with but little water, the caustic soda or caustic potash, the water, assisted by the presence, also, of the caustic alkali, carries off a considerable proportion of chloride of lead, of which it is impossible to rid it. Therefore this process, so simple, has not been industrially applied. Now, chloride of lead is completely insoluble in alcohol, even of fifty per cent.; and my process consists, mainly, in effecting the washing of the paste of chloride of lead, hereinabove described, with alcohol, which carries away the whole of the caustic soda or potash pure at small expense, for one-fourth part, by weight, of alcohol to the weight of the caustic alkalies is sufficient for this extraction, and nearly all this alcohol may be recovered by distillation. I arrive thus by the one step at the final result, while by the old processes, after having obtained caustic potash or soda by costly processes, they must afterward be purified by alcohol.

My process embraces four operations, as follows: first, the transformation of common salt or of chloride of potassium by the presence of oxide of lead and the equivalent of water into chloride of lead, which is completely insoluble in alcohol, and pure caustic potash or soda, ($KO,HO$ or $NaO,HO$,) which is, on the contrary, very soluble in alcohol, which does not dissolve the other salts; second, the washing by alcohol of the very heavy chloride of lead to separate from it the caustic alkalies in alcoholic solution, very light relatively, and consequently easily separable; third, the evaporation of the alcoholic solution to recover from it the greater part of the alcohol, the addition of water to the alkaline residue to separate by distillation the last traces of alcohol, and the final concentration to a consistency of solidification; fourth, the revivification of the oxide of lead. These very simple operations occupy but a few hours and give immediately pure caustic potash and soda at very remunerative prices. Even with loss of the oxide of lead, this process would give for potash great advantages over the processes now in use; but this oxide is not lost, for it is easy to regenerate it in the following manner: Chloride of lead is sufficiently soluble, when hot, in water, (after the caustic soda or potash has been separated from it.) I treat this solution by iron, and most advantageously by white cast-iron, which separates the lead completely from it in the metallic state. The lead oxidized by the ordinary processes reproduces litharge or oxide of lead, which may thus serve indefinitely, minus the losses inherent to all manufacture.

Instead of revivifying the lead by the moist method, as above mentioned, the revivification may be effected by the metallurgical processes heretofore employed for the treatment of sulphuret of lead. I should insist on the following point—that is, that by the revivification of the lead by white cast-iron I obtain an equivalent proportion of chloride of iron. Now, chloride of iron is the best salt for disinfection, and much preferable to sulphate of iron. This chloride has no industrial or commercial existence, because its direct manufacture would put it at too high a price; but by the method of revivification of the lead it becomes a waste product, and may be supplied at a price which will assure it a sale.

It may be seen that the result of the operations which I have described is the production of pure caustic soda or caustic potash from chloride of sodium or chloride of potassium, and, as a residual product, chloride of iron.

Having thus described my complete process of manufacturing pure caustic soda and caustic potash, I should observe that when it shall be desirable to obtain these alkalies in the state of carbonates my process becomes yet simpler and permits the direct manufacture of carbonates of soda and potash without going through the production of caustic alkalies, in which case I operate as follows: After having obtained by litharge and chloride of potassium the mixture of chloride of lead and caustic potash, and then having extracted the caustic potash by alcohol, as hereinabove described, there is nothing more to be done but to cause the passage through the alcoholic potassic liquor of a current of carbonic acid, which instantly precipitates the carbonate of potash and sets at liberty the alcohol, which may be used indefinitely, without the necessity of rectification, for the separation of the potash. I obtain thus at one operation, and cold, carbonate of potash, without having to incur the expense and the losses involved when caustic potash is the final product. For carbonate of soda, which is less insoluble in alcohol than carbonate of potash, there is a slight difficulty to overcome. It is necessary to rid the alcohol of the small quantity of carbonate which it may retain by a little lime, because the carbonate would be prejudicial to the reaction of the chloride of sodium with the litharge. For carbonate of soda, which is precipitated by carbonic acid, the expense is much less than in the Solway process, by which a bicarbonate of ammonia must be produced. It may be seen, then, that the manufacture of carbonates of potash and of soda simplifies much the general process, necessitates the employment of less apparatus, and does away with the heat necessary to calcine caustic alkalies. I may, then, by my process produce at will and with equal relative economy caustic alkalies or alkaline carbonates.

What I claim as my invention is—

1. The process of manufacturing carbonate of soda or carbonate of potash, consisting in first effecting the decomposition of chloride of sodium or chloride of potassium by the oxide of lead in presence of water, to produce a mixture of chloride of lead and caustic soda or caustic potash, afterward dissolving and washing out the caustic soda or caustic potash from the chloride of lead with alcohol, and afterward subjecting the alcoholic solution to the action of carbonic acid, and recovering the lead in the moist way by precipitating with white cast-iron, substantially as herein described.

2. In the manufacture of sodium carbonate, decomposing chloride of sodium or chloride of potassium by the oxide of lead in presence of the equivalent of water necessary to produe the hydrates KO,HO or NaO,HO, thereby producing a mixture of chloride of lead and caustic soda or caustic potash, and afterward extracting the caustic soda or caustic potash from said mixture by washing it with alcohol, substantially as herein described.

3. The revivification of the chloride of lead obtained in the processes hereinabove described into metallic lead, and then into oxide of lead or litharge, in the moist way, by precipitation with white cast-iron and subsequent oxidation, substantially as herein described.

In testimony whereof I have signed this specification in the presence of two subscribing witnesses.

CLOVIS KNAB.

Witnesses:
 EUG. DUBOIS,
 A. KREMPP.